No. 736,837. Patented August 18, 1903.

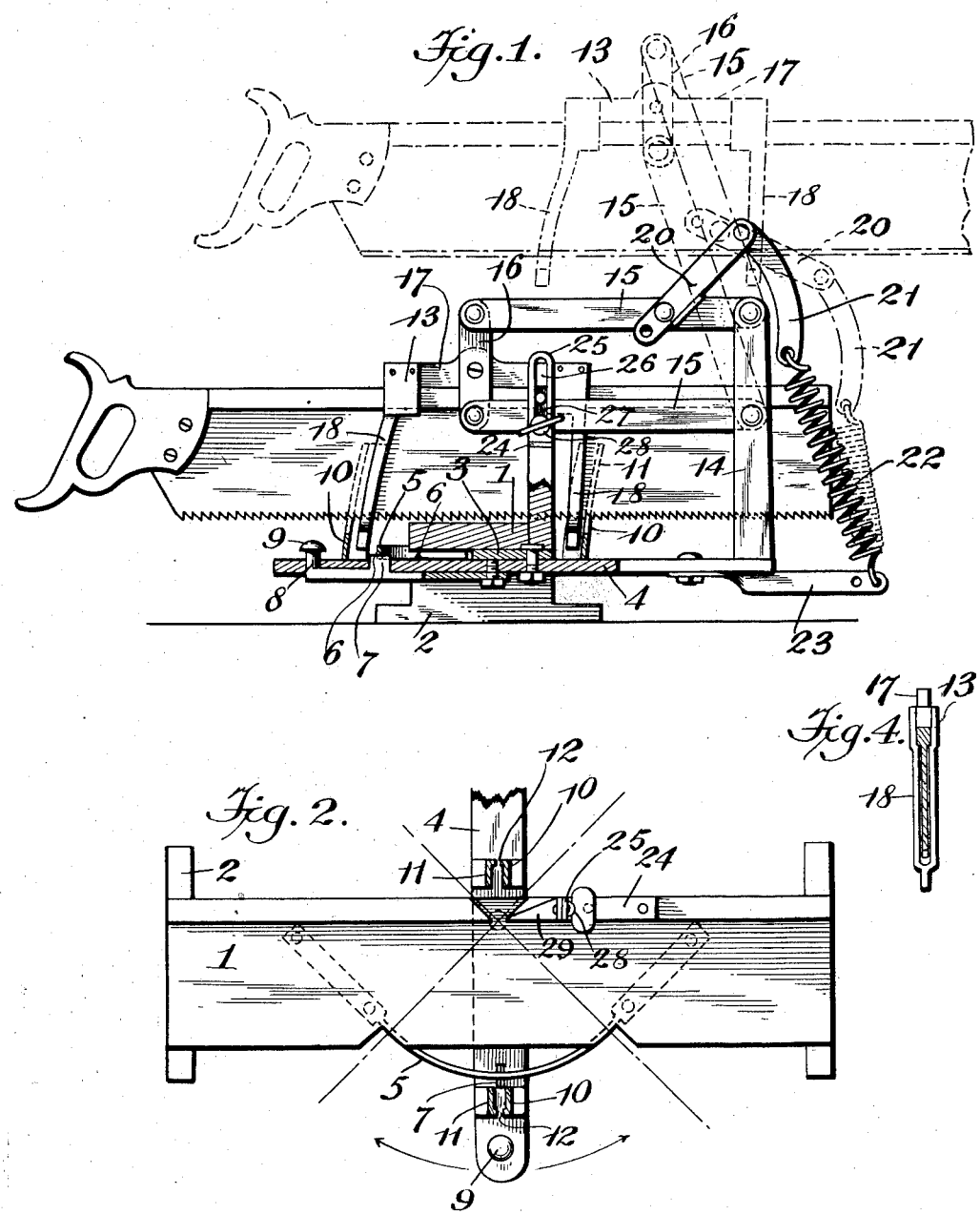

UNITED STATES PATENT OFFICE.

ANDREW P. FORSLING, OF SIOUX CITY, IOWA.

MITER-BOX.

SPECIFICATION forming part of Letters Patent No. 736,837, dated August 18, 1903.

Application filed May 23, 1903. Serial No. 158,491. (No model.)

*To all whom it may concern:*

Be it known that I, ANDREW P. FORSLING, a citizen of the United States of America, residing at Sioux City, in the county of Woodbury and State of Iowa, have invented certain new and useful Improvements in Miter-Boxes, of which the following is a specification.

This invention relates to new and useful improvements in miter-saws, and has for its object the provision of novel means whereby the saw is adjusted and retained in its adjusted position in a novel manner, so that said saw may be manipulated uniformly on all of the work.

Furthermore, an object of the invention is to produce a saw-guide and a saw-carrier coacting with the miter and means for limiting the depth of the cut of the saw.

Furthermore, an object of the invention is to produce a saw-carrier and a guide and a swinging frame for the carrier and guide, whereby the saw is allowed to rise and descend according to the wishes of the operator.

Finally, the object of the invention is to produce a saw-carrier and miter-box which will possess advantages in points of efficiency and durability, proving at the same time comparatively inexpensive.

With the foregoing and other objects in view the invention consists in the details of construction and in the arrangements of parts to be hereinafter more fully set forth and claimed.

In describing the invention in detail reference will be had to the accompanying drawings, forming part of the specification, wherein like characters denote corresponding parts in the several views, and in which—

Figure 1 is a view in elevation of the miter-box and saw-carrier embodying the invention. Fig. 2 is a plan view of a part of the miter-box in connections. Fig. 3 is a view in elevation, showing the gage; and Fig. 4 is an end view of one of the hangers.

In the drawings, 1 denotes a miter-box supported on a suitable base 2, and the under side of said box is provided with a bearing-plate 3. A table 4 is pivoted under the box by means of a bolt passing through the table and engaging the plate, and said table is allowed to swing in an arc of a circle with both ends projecting from the sides of the miter-box.

A guide 5 projects from the side of the miter-box in a curve and is provided with notches 6 in its lower edge, adapted to receive a spring-actuated detent 7, which is secured under the table and has an extension 8 passing through the table and terminating in a push-knob 9. By means of the detent the table may be adjusted transversely or obliquely with relation to the miter-box.

Guides 10 are anchored on the upper surface of the table and comprise strips of metal 11, standing parallel and having their edges turned inwardly toward each other, but terminating to produce an intervening space in which the saw may travel. The inwardly-turned edges 12 form shoulders to engage and retain the saw-guide 13, so as to prevent undue movement of the said guide as the saw is reciprocated.

At the rear of the table is a post 14, to which is pivoted the arms 15, said arms 15 extending forwardly and having their ends connected by a link 16. The saw-hanger comprises a horizontally-disposed arm 17, pivoted centrally to the link 16 and having at each end a housing 18 of such shape as to receive the head of the saw, the said housing being formed integral with the guides 13, which are adapted to enter the way between the parallel strips 11, and movement of the said guides is confined.

The upper arm has an extension 20, to which the link 21 is pivoted, and the link in turn has a spring 22 attached to its lower end in order that the saw-carrier may be elevated and held elevated through the action of the spring. The projection 23 is attached to the rear end of the table, and the lower end of the spring is secured thereto.

In order to limit the depth of the cut of the saw, I provide a gage comprising a plate 24, having a vertical section 25, with the slot 26. A plate 27 has a threaded hole for the reception of the binding-nut 28, the said plate having an extension 29, which is in the path of travel of one of the arms, so that as the arm descends a predetermined distance it contacts with the extension and prevents further downward movement of the saw.

Having fully described my invention, what I claim as new, and desire to secure by Letters Patent, is—

1. In a device of the character described, a miter-box, a table pivoted with relation to the miter-box, arms pivotally supported above the table and movable therewith, a saw carrier and guide pivoted at the ends of the arms and guides on the table with which the saw-carrier engages.

2. In a device of the character described, a miter-box, a table pivoted with relation to the miter-box, arms pivotally supported above the table and movable therewith a saw carrier and guide pivoted at the ends of the arms, guides on the table with which the carrier engages and a gage for limiting the downward movement of the saw-carrier.

3. In a device of the character described, a miter-box, a table pivoted with relation to the miter-box, a guide secured to the miter-box and means on the table for engaging and holding said table in adjusted position, arms pivotally supported above the table and movable therewith a saw carrier and guide pivoted at the ends of the arms, guides on the table with which the carrier engages and a gage for limiting the downward movement of the saw-carrier.

In testimony whereof I affix my signature, in the presence of two witnesses, this 23d day of April, 1903.

ANDREW P. FORSLING.

Witnesses:
R. H. BROWN,
IONA SWEET.